(12) United States Patent
Weiss et al.

(10) Patent No.: US 10,053,045 B2
(45) Date of Patent: Aug. 21, 2018

(54) VEHICLE OCCUPANT PROTECTION DEVICE AND VEHICLE SEAT

(71) Applicant: TRW AUTOMOTIVE GMBH, Alfdorf (DE)

(72) Inventors: Jochen Weiss, Heubach (DE); Lars Zimmermann, Welzheim (DE); Jürgen Schmidt, Stuttgart (DE)

(73) Assignee: TRW AUTOMOTIVE GmbH (DE)

( * ) Notice: Subject to any disclaimer, the term of this patent is extended or adjusted under 35 U.S.C. 154(b) by 0 days.

(21) Appl. No.: 15/306,122

(22) PCT Filed: May 6, 2015

(86) PCT No.: PCT/EP2015/000924
§ 371 (c)(1),
(2) Date: Oct. 24, 2016

(87) PCT Pub. No.: WO2015/172868
PCT Pub. Date: Nov. 19, 2015

(65) Prior Publication Data
US 2017/0057449 A1    Mar. 2, 2017

(30) Foreign Application Priority Data

May 13, 2014  (DE) .................... 10 2014 006 862 U

(51) Int. Cl.
*B60R 21/21* (2011.01)
*B60R 21/207* (2006.01)
(Continued)

(52) U.S. Cl.
CPC ............ *B60R 21/21* (2013.01); *B60R 21/207* (2013.01); *B60R 21/2338* (2013.01);
(Continued)

(58) Field of Classification Search
CPC ..... B60R 21/21; B60R 21/26; B60R 21/2338; B60R 21/207; B60R 21/23138;
(Continued)

(56) References Cited

U.S. PATENT DOCUMENTS

| 5,380,038 | A | * | 1/1995 | Hawthorn | ............. | B60R 21/233 280/730.1 |
| 5,564,734 | A |   | 10/1996 | Stuckle | | |

(Continued)

FOREIGN PATENT DOCUMENTS

| DE | 9303231 | 7/1902 |
| DE | 4019596 | 1/1992 |

(Continued)

*Primary Examiner* — Drew J Brown
(74) *Attorney, Agent, or Firm* — Tarolli, Sundheim, Covell & Tummino LLP

(57) ABSTRACT

In a vehicle occupant protection device (20) comprising an airbag (22), especially for a passenger, including a fastening portion (24) as well as an inflatable restraining portion (26) being especially adjacent to the fastening portion (24), it is provided that the fastening portion (24) is arranged beside the sitting position of the vehicle occupant (12) and the restraining portion (26) is configured so that in the fully inflated unloaded state the airbag (22) extends in front of the vehicle occupant (12). There is further provided a vehicle seat (10) comprising a vehicle occupant protection device (20) of this type, wherein the fastening portion (24) and/or the inflator (28) are arranged on the side of or within the vehicle seat (10), especially on or within the seat cushion (14).

19 Claims, 2 Drawing Sheets

(51) Int. Cl.
*B60R 21/231* (2011.01)
*B60R 21/2338* (2011.01)
*B60R 21/26* (2011.01)
*B60R 21/00* (2006.01)

(52) U.S. Cl.
CPC ........ *B60R 21/23138* (2013.01); *B60R 21/26* (2013.01); *B60R 2021/0004* (2013.01); *B60R 2021/23146* (2013.01); *B60R 2021/23382* (2013.01)

(58) Field of Classification Search
CPC .. B60R 2021/23382; B60R 2021/0004; B60R 2021/23146
See application file for complete search history.

(56) References Cited

U.S. PATENT DOCUMENTS

| | | | |
|---|---|---|---|
| 5,575,497 A | | 11/1996 | Suyama et al. |
| 6,073,960 A | * | 6/2000 | Viano .................. B60R 21/231 |
| | | | 280/730.1 |
| 8,651,515 B2 | * | 2/2014 | Baba .................... B60R 21/233 |
| | | | 280/729 |
| 9,027,957 B2 | * | 5/2015 | Baba ................ B60R 21/23138 |
| | | | 280/729 |
| 2000/0131647 | | 6/2006 | Sato et al. |
| 2015/0367804 A1 | * | 12/2015 | Fujiwara ............... B60R 21/207 |
| | | | 280/730.2 |
| 2017/0259774 A1 | * | 9/2017 | Matsushita ....... B60R 21/23138 |

FOREIGN PATENT DOCUMENTS

| | | | | |
|---|---|---|---|---|
| JP | 4110252 | | 4/1992 | |
| JP | 2007145302 A | * | 6/2007 | ............. B60R 21/18 |

\* cited by examiner

VEHICLE OCCUPANT PROTECTION DEVICE AND VEHICLE SEAT

RELATED APPLICATION

This application corresponds to PCT/EP2015/000924, filed May 6, 2015, which claims the benefit of German Application No. 10 2014 006 862.5, filed May 13, 2014, the subject matter of which are incorporated herein by reference in their entirety.

BACKGROUND OF THE INVENTION

The invention relates to a vehicle occupant protection device comprising an airbag, especially for a passenger, having a fastening portion as well as an inflatable restraining portion especially being adjacent to the fastening portion. The invention further relates to a vehicle seat comprising a vehicle occupant protection device of this type.

Airbags which are adapted to inflate upon crash of the vehicle and to absorb or at least to dampen the impact of the vehicle occupant onto vehicle structures in the interior are used in various embodiments inside the vehicle. Usually said airbags are arranged in the vehicle structure onto which the vehicle occupant may impact so that they can deploy toward the vehicle occupant in the case of crash. Front impact airbags are mounted, for example, in the vehicle steering wheel, in the instrument panel or on the passenger side beneath the vehicle interior lining arranged in front of the vehicle occupant. In the case of crash of the vehicle, the vehicle interior lining will open so that the airbag can deploy in front of the vehicle occupant.

The arrangement of the airbag beneath the vehicle interior lining restricts the options in terms of design of the vehicle interior, however. The surface and the material of the vehicle interior lining have to be selected so that they form a stable and high-quality surface during normal use of the vehicle. In the case of crash of the vehicle and of deployment of the airbag said surface is required to be easily opened via predetermined breaking points, however, so that the airbag can quickly deploy into the vehicle interior.

It is further required to select the materials and the structure of the vehicle interior lining so that, in the case of crash end of deployment of the airbag, they exhibit a most uncomplicated behavior so that no loose parts of the vehicle interior lining will fly around.

When arranging additional trays or compartments at the vehicle interior lining, in addition the arrangement and the direction of deployment of the airbag have to be taken into account.

SUMMARY OF THE INVENTION

It is the object of the invention to provide a vehicle occupant protection device comprising an airbag which allows for a mere flexible design of the vehicle interior. It is another object of the invention to provide a vehicle seat comprising a vehicle occupant protection device of this type.

For achieving the object it is provided in a vehicle occupant protection device comprising an airbag, especially for a passenger, which includes a fastening portion as well as an inflatable restraining portion being especially adjacent to the fastening portion that the fastening portion is arranged beside the sitting position of the vehicle occupant and the restraining portion is configured so that in the fully inflated unloaded state the airbag extends in front of the vehicle occupant.

In accordance with the invention, the airbag is not arranged beneath the vehicle interior lining in front of the vehicle occupant but beside the vehicle occupant, for example at the vehicle seat. In the case of crash the airbag deploys in front of the vehicle occupant so that reliable protection of the vehicle occupant is possible. Since the airbag is arranged beside the vehicle occupant, a more flexible design of the vehicle interior lining and of the instrument panel is possible. In particular, it is not necessary to arrange predetermined breaking points for the airbag in the vehicle interior lining so that a more flexible choice of material and design are possible.

In order to enable reliable protection of the vehicle occupant the airbag is preferably configured so that in the inflated state it rests on the thigh and/or on the vehicle interior lining positioned in front of the vehicle occupant to be protected. Hence the airbag to a certain extent fills the clearance between the vehicle interior lining and the upper body of the vehicle occupant so that the airbag is prevented from backing away as it rests on the vehicle interior lining and, resp., on the thigh and thus reliable protection of the vehicle occupant is ensured.

It Is additionally possible that in the inflated state the airbag rests on the vehicle door and/or the outer wall of the vehicle so that the airbag is reliably prevented from being pressed aside when the vehicle occupant impacts on the airbag.

The airbag according to the invention is suited both for the protection of vehicle occupants seated on the front seats and for the protection of vehicle occupants seated on rear seats in the case of a front crash or an angular crash. Since in most cases the seats in the second or third seat row are not or only slightly adapted to be longitudinally shifted, in these cases the airbag cannot be arranged only in the respective vehicle seat but may also be arranged in the side covering.

The fastening portion may be arranged on the side of the vehicle occupant on which the vehicle door and/or outer wall associated with him/her is provided. In this embodiment the airbag cannot back away from the door toward the interior, as the airbag is retained by the fastening portion in this direction. To the opposite direction, toward the vehicle door or the outer wall, the airbag is prevented from backing away by its contact with the vehicle door or the outer wall. Thus after deploying and inflating the airbag is reliably held in the position in front of the vehicle occupant.

For defining the shape of the airbag in the fully inflated state so that the airbag will reliably deploy in front of the vehicle occupants, in the airbag for example a tether is provided which extends substantially diagonally in space from the fastening portion into the upper corner of the airbag being opposed in the fully inflated state. Said tether thus defines the space diagonal of the airbag and stabilizes the airbag so that it may move in front of the vehicle occupant and deploy there in the desired shape.

In the airbag also a tether, especially a further tether, may be provided which extends along the portion of the restraining portion associated with the vehicle side facing the vehicle occupant from the fastening portion to the front upper edge in the completely inflated state of the airbag. Said tether extends to a certain extent along a side wall of the airbag diagonally upwards, whereby the shape and the position of the airbag are reliably predetermined, especially in combination with a tether diagonal in space.

Moreover the vehicle occupant protection device includes an inflator, for example, which is in fluid communication with the restraining portion of the airbag, with the inflator being arranged on the vehicle side beside the vehicle occupant. The inflator thus may be arranged in a space-saving manner jointly with the airbag beside the vehicle occupant, for example inside the vehicle seat or on the vehicle body.

The inflator and/or the airbag may be mounted on the vehicle side beside the vehicle seat. Preferably the inflator and/or the fastening portion are retained on the vehicle seat in the case of longitudinally shiftable vehicle seats, however. This arrangement offers the advantage that the vehicle occupant protection device can be shifted jointly with the vehicle seat so that an ideal orientation of the vehicle occupant protection device and of the inflated airbag relative to the vehicle seat is constantly ensured. Especially in the case of vehicle seats which may be shifted both in the vehicle direction and laterally, the airbag thus may always deploy reliably in front of the vehicle occupant.

In order to ensure that the airbag deploys reliably in front of the vehicle occupant the fastening portion is an extension projecting downwards vis-à-vis the restraining portion, for example. Said extension may be hose-shaped, for example. When inflating the airbag, at first said hose-shaped extension is deployed so that the restraining portion moves in front of the vehicle occupant. After that, the airbag can completely deploy. This ensures that the fastening portion will not deploy between the vehicle seat and the outer wall of the vehicle but only in front of the vehicle occupant.

Furthermore, for achieving the object a vehicle seat comprising an airbag subassembly is provided, wherein the fastening portion and/or the inflator are arranged on the side of or inside the vehicle seat, especially at or within the seat cushion. The vehicle occupant protection device may be shifted, for example, when the vehicle seat is shifted forward or rearward, along with the latter so that the airbag always can deploy in a defined position related to the vehicle seat. In addition, such vehicle seat may also be used in vehicles having plural separately adjustable seats, for example also at the rear sitting positions.

BRIEF DESCRIPTION OF THE DRAWINGS

Further advantages and features will be evident from the following description in combination with the enclosed drawings, in which.

DESCRIPTION

Figure 1:
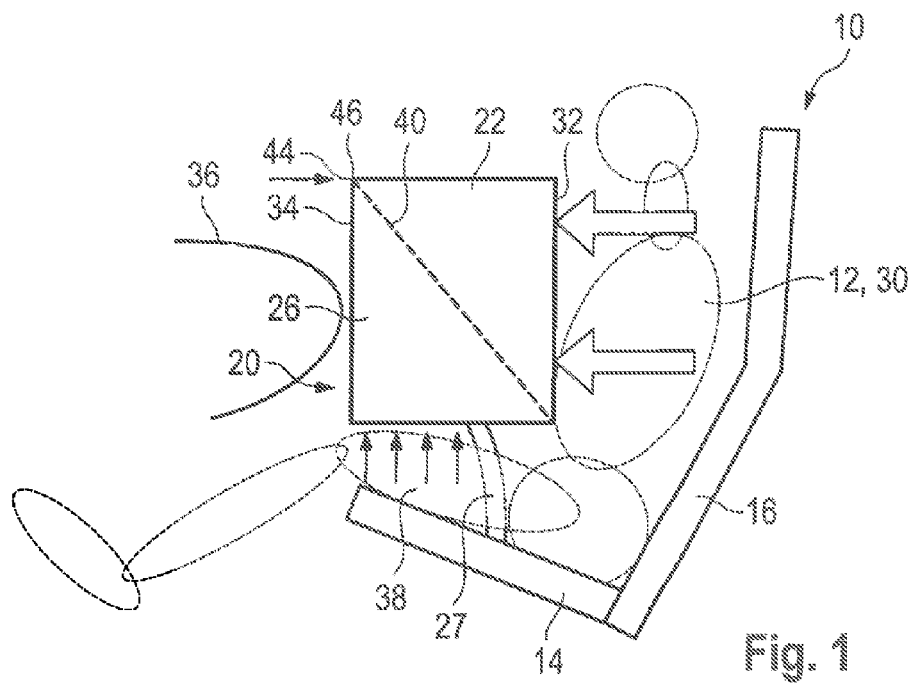
FIG. 1 shows a schematic representation of a vehicle seat according to the invention comprising a vehicle occupant protection device according to the invention including an airbag in the fully inflated unloaded state.
Figure 2:
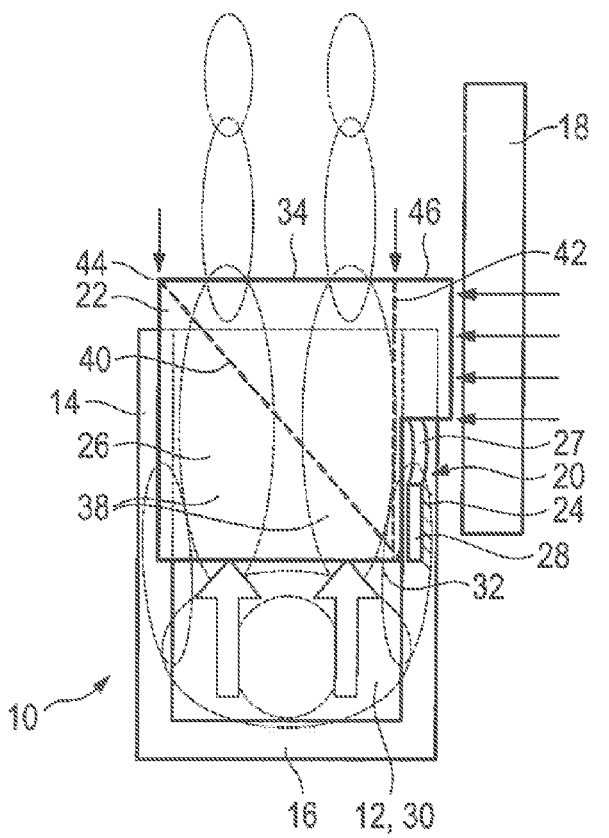
FIG. 2 shows a top view of the vehicle seat of FIG. 1.

In FIGS. 1 and 2 a vehicle seat 10 for a vehicle occupant 12 is shown. The vehicle seat 10 includes a seat cushion 14 and a backrest 16 to accommodate the vehicle occupant 12. As is evident from FIG. 2, the vehicle seat 10 is a passenger seat to which a vehicle door 18 is associated.

On the side of the vehicle seat 10 and, resp., of the seat cushion 14 facing the vehicle door 18, at the seat cushion 14 a vehicle occupant protection device 20 is provided which includes an airbag 22 illustrated in FIGS. 1 and 2 in the completely deployed and inflated state. In the folded state the airbag 22 is provided beside the vehicle occupant 12 at the seat cushion 14.

The airbag 22 includes a fastening portion 24 by which the airbag 22 is retained on the seat cushion 14 of the vehicle seat 10. Adjacent to this fastening portion 24 is a restraining portion 26 which in the inflated state of the airbag 22 shown in FIGS. 1 and 2 is substantially rectangular and extends in front of the vehicle occupant 12.

The fastening portion 24 includes a hose-shaped extension 27 projecting downwards vis-à-vis the restraining portion 26.

The vehicle occupant protection device 20 furthermore includes an inflator 28 equally retained on the side of the seat cushion which is in fluid communication with the restraining portion 26. The gas flowing out of the inflator 28 flows via the fastening portion 24 and the extension 2 into the restraining portion 26 so that the airbag 22 may deploy.

In the home position the airbag 22 is provided in a folded state within the or on the side of the seat cushion 14 facing the vehicle door 18.

In the case of restraint, the gas exiting the inflator 28 flows into the fastening portion 24 and from there into the restraining portion 26. As the gas first flows into the fastening portion 24, the latter as well as the extension 27 deploy first so that the still folded restraining portion 26 in a driving direction F moves in front of the vehicle occupant 12. Subsequently the restraining portion 28 is inflated so that it takes its substantially rectangular block shape.

If, due to the deceleration of the vehicle, the upper body 30 of the vehicle occupant 12 is shifted forward, it contacts the rear side 32 of the restraining portion 26. As is evident from FIG. 1, if the upper body 30 is further shifted forward, the restraining portion 26 rests with the front side 34 on the vehicle interior lining 36 positioned in front of the vehicle occupant 12 and on the thighs 36 of the vehicle occupant 12. Thus the restraining portion 26 cannot back away in the driving direction so that the forward shifting of the upper body 30 of the vehicle occupant 12 is absorbed and/or dampened.

Furthermore, the restraining portion 26 laterally rests on the vehicle door 18 so that the restraining portion 26 is equally prevented from laterally backing away to the right with respect to FIG. 2. Lateral backing away in the opposite direction, viz. to the left with respect to FIG. 2, is not possible, either, as the fastening portion 24 is provided on the side of the seat cushion 14 facing the vehicle door 18 and in this way holds the restraining portion in front of the vehicle occupant 12.

As is evident from FIGS. 1 and 2, inside the airbag 22, especially inside the restraining portion 26, a tether 40 as well as a further tether 42 is provided for defining the shape of the restraining portion 28 in the fully inflated state.

The first tether 40 extends from the fastening portion 24 substantially diagonally in space into the opposite upper corner 44 and is fastened there at the interior of the restraining portion 26. The second tether 42 extends from the fastening portion 24 substantially along the portion of the restraining portion 26 which is associated with the vehicle side facing the vehicle occupant 12, in this case the vehicle door 18, diagonally to the upper edge 46 of the restraining portion 26.

The front upper edge 46 of the restraining portion 26 is spatially defined by said two tethers 40, 42 so that in the inflated state the airbag 22 is held in its shape and in the position in front of the vehicle occupant 12.

Figure 3:
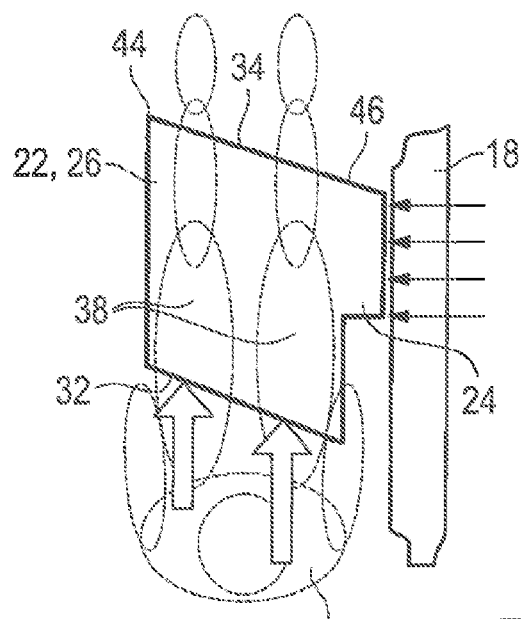
FIG. 3 shows a top view of the vehicle seat of FIG. 1 when the vehicle occupant has moved forward.
Figure 4:
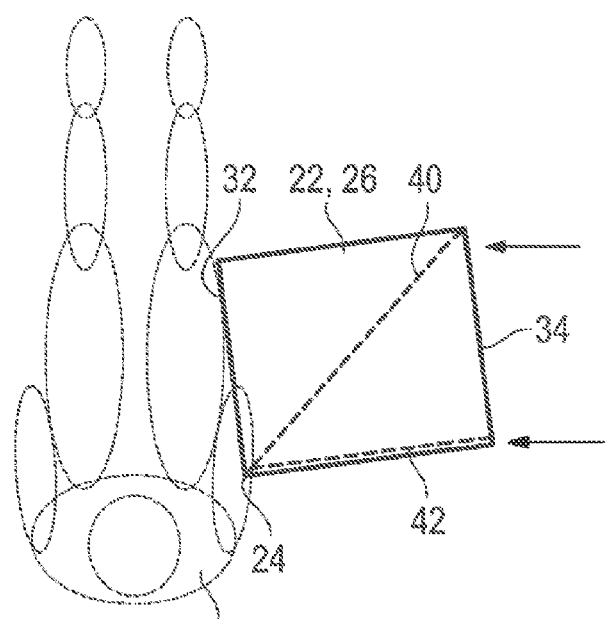
FIG. 4 shows a view of the vehicle seat of FIG. 1 when the vehicle door is opened.

In this completely inflated state the airbag 22 could only rotate clockwise about the fastening portion 24 with respect to FIG. 2, if at all, as this is possible in FIG. 4 when the vehicle door 18 is opened. When the vehicle door 18 is closed, this movement is not possible, however, as is visible in FIGS. 2 and 3, because the restraining portion 26 contacts the vehicle door 18 and rests on the same.

As is illustrated in FIGS. 2 and 3, the vehicle occupant protection device 20 is arranged on or in the vehicle seat 10, especially in the seat cushion 14. In this way the airbag 22 is always guaranteed, even when the vehicle seat 10 is shifted in the driving direction F or perpendicularly thereto, to be arranged in a defined position relative to the vehicle seat 10 and to be adapted to deploy directly in front of the vehicle occupant 12. Especially in vehicles permitting flexible arrangement of the vehicle seats the airbag 22 can be ensured to deploy always in front of the vehicle occupant 12 so as to dampen a forward shifting of the vehicle occupant 12.

Irrespective thereof, it is also possible, however, that the vehicle occupant protection device 20 is mounted beside the vehicle occupant 12 in a way fixed to the vehicle body or the vehicle door 18. It has merely to be ensured that the fastening portion 24 is arranged beside the vehicle occupant 12 and takes such shape that the restraining portion 26 can deploy in front of the vehicle occupant 12.

In particular it is also possible that the vehicle occupant protection device 20 is arranged on the side of the vehicle seat 10 facing away from an outer wall or a vehicle door 18.

The invention claimed is:

1. A vehicle occupant protection device (20) comprising an airbag (22), for protection in the case of front impact, the airbag comprising a fastening portion (24) as well as an inflatable restraining portion (26) being especially adjacent to the fastening portion (24), wherein the fastening portion (24) is arranged beside the sitting position of the vehicle occupant (12) and the restraining portion (26) is configured so that in the completely inflated unloaded state the airbag (22) extends in front of the vehicle occupant (12), wherein a tether (40) extending from the fastening portion (24) substantially diagonally in space into the upper corner of the airbag (22) opposed in the fully inflated state is provided in the airbag (22).

2. The vehicle occupant protection device according to claim 1, wherein the airbag (22) is configured to rest, in the inflated state, on the thigh (38) and/or on the vehicle interior lining (36) positioned in front of the vehicle occupant (12) to be protected.

3. The vehicle occupant protection device according to claim 1, wherein in the inflated state the airbag (22) rests on the vehicle door (18) and/or on the outer wall of the vehicle.

4. The vehicle occupant protection device according to claim 1, wherein the fastening portion (24) is arranged on the side of the vehicle occupant (12) where the vehicle door (18) associated with him/her is located.

5. The vehicle occupant protection device according to claim 1, wherein a further tether (42) which extends along the portion of the restraining portion (26) associated with the vehicle side facing the vehicle occupant from the fastening portion (24) to the upper front edge in the fully inflated state of the airbag (22) is provided in the airbag (22).

6. The vehicle occupant protection device according to claim 1, further comprising an inflator (28) being in fluid communication with the restraining portion (26) of the airbag (22), wherein the inflator (28) is arranged on the vehicle side beside the vehicle occupant (12).

7. The vehicle occupant protection device according to claim 6, wherein the inflator (28) and/or the fastening portion (24) are retained on a vehicle seat (10) or on the vehicle body.

8. The vehicle occupant protection device according to claim 1, wherein the fastening portion (24) is an extension projecting downward vis-à-vis the restraining portion (26).

9. A vehicle seat (10) comprising a vehicle occupant protection device (20) according to claim 6, wherein the fastening portion (24) and/or the inflator (28) are arranged on the side of or within the vehicle seat (10), especially on or within the seat cushion (14).

10. The vehicle occupant protection device according to claim 1, wherein the tether extends from a lower corner of the airbag adjacent to the fastening portion to the upper corner.

11. The vehicle occupant protection device according to claim 10, wherein the lower corner is at an intersection of a rear side of the airbag, an outboard side of the airbag, and a bottom of the airbag.

12. The vehicle occupant protection device according to claim 1, wherein the upper corner is at an intersection of a front side of the airbag, an inboard side of the airbag, and a top of the airbag.

13. The vehicle occupant protection device according to claim 5, wherein the tether and the further tether are secured to the upper front edge of the airbag.

14. A vehicle occupant protection device for protection in case of a front impact comprising:
an airbag including a fastening portion and an inflatable restraining portion adjacent to the fastening portion, the fastening portion being arranged beside a sitting position of the vehicle occupant, the restraining portion having an inflated state configured to extend in front of the vehicle occupant; and
a tether extending diagonally within the airbag from the fastening portion to an upper corner of the airbag opposing the vehicle occupant when the airbag is in the inflated state.

15. The vehicle occupant protection device according to claim 14, wherein the tether extends from a lower corner of the airbag adjacent to the fastening portion to the upper corner.

16. The vehicle occupant protection device according to claim 15, wherein the lower corner is at an intersection of rear side of the airbag, an outboard side of the airbag, and a bottom of the airbag.

17. The vehicle occupant protection device according to claim 14, wherein the upper corner is at an intersection of a front side of the airbag, an inboard side of the airbag, and a top of the airbag.

18. The vehicle occupant protection device according to claim 14, wherein the tether is secured to a front upper edge of the airbag.

19. The vehicle occupant protection device according to claim 18 further comprising an additional tether extending within the airbag from the fastening portion to the front upper edge of the airbag.

* * * * *